April 7, 1959   J. L. HANCOCK   2,881,368
VENT CAP FOR ELECTROLYTIC CONDENSER
Filed Jan. 14, 1955

INVENTOR.
James L. Hancock
BY Craig V. Menton
His Attorney

United States Patent Office 2,881,368
Patented Apr. 7, 1959

2,881,368

VENT CAP FOR ELECTROLYTIC CONDENSER

James L. Hancock, Dayton, Ohio, assignor to General Motors Corporation, Detroit, Mich., a corporation of Delaware Application January 14, 1955, Serial No. 481,729

5 Claims. (Cl. 317—230)

This invention relates to electrical condenser or capacitor assemblies of the type in which the condenser is sealed within a housing, and particularly to electrolytic condensers or oil filled condensers or capacitors that are susceptible to internal gasification for various reasons known to those skilled in the art.

One of the problems concerning electrical condensers or capacitors of the type mentioned concerns the proper venting of gases from within the housing when internal gas pressure rises above a predetermined value, it being necessary to provide for suitable venting of the gases to eliminate explosion of the condenser or capacitor. It is the common practice to provide vent plugs in one end of the casing for a condenser or capacitor, the vent plug usually being provided in the closure cover member for the housing of the condenser, which closure cover member also carries the terminal elements providing for suitable electrical connection of the condenser or capacitor in an electric circuit. The conventional vent plug provided in the closure cover member for an electrolytic condenser or capacitor is usually of the type that blows out of the cover member or ruptures so that after a venting of the condenser or capacitor has occurred there is an opening left in the closure cover member that is not thereafter resealed. Thus the condenser or capacitor is susceptible to drying out, entry of dirt and foreign matter into the capacitor or condenser and spilling of the electrolyte from within the condenser or capacitor housing.

It is therefore an object of this invention to provide an electrical condenser or capacitor with a closure cover member for one end of the housing containing a suitable condenser of the electrolytic or oil type that is adapted to seal the end of the housing to provide for complete closure of the condenser within the housing but which is adapted to be unseated from a sealing seat against the resilient resistance of a retaining member so that the closure member can permit venting of the gas pressure from within the condenser housing when the pressure rises abnormally to a predetermined value, but which closure member will reseat upon its sealing seat as urged by the resilient retaining member after the high pressure gas has been released from within the condenser housing.

It is another object of the invention to provide an electrical condenser or capacitor of the electrolytic or oil filled type having features of the foregoing object and wherein the closure cover member comprises a laminated structure having a central rigid-like but not wholly inflexible member that is provided with a resilient ply layer or member on both faces of the rigid-like member with the resilient ply layers being coextensive with the faces of the rigid-like member.

Further objects and advantages of the present invention will be apparent from the following description, reference being had to the accompanying drawings wherein a preferred form of the invention is clearly shown.

Figure 2:
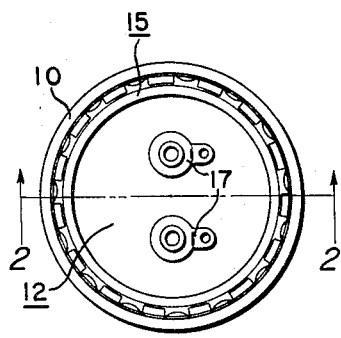
Figure 2 is a plan view of the closure end of the capacitor.

In this invention the condenser or capacitor comprises a shell or housing 10 in which there is placed a conventional paper and metal foil condenser or capacitor 11 that may be of the electrolytic type, or the oil filled type well-known to those skilled in the art. The housing 10 is closed at the open end thereof by means of a closure or cover member 12 retained in position in the open end of the housing by means of a resilient retaining ring 15. The condenser 11 is provided with the usual terminal leads 16 adapted to be suitably connected to the terminals 17 provided in the cover member 12.

The housing 10 has one internal diameter or bore 18 that provides the major chamber 29 receiving the condenser 11. The housing 10, that is the housing wall, is provided with a second larger bore 19 in the open end thereof that is connected with the smaller bore 18 by means of a planar shoulder 20. The shoulder 20 is therefore provided on the inner peripheral wall of the housing wall 10 and extends at a uniform level inwardly of the open end 21 of the housing.

At the open end 21 of the housing 10 there is provided an annular protrusion 22 extending around the inner periphery of the bore 19 and spaced uniformly from the shoulder 20 to provide a second shoulder 23 spaced uniformly from the first shoulder 20.

The cover member 12, or closure member, is a laminated structure comprising a rigid-like member or disk 30 having a first ply layer of resilient material 31 on one face and the second ply layer of resilient material 32 on the opposite face. The resilient ply layers 31 and 32 extend throughout the surface area of the opposite faces of the rigid-like member 30 and are thus coextensive with the rigid-like member 30. The rigid-like member 30 is not completely inflexible, but preferably is adapted to have some flexibility that it may flex during a venting operation hereinafter more fully described.

The closure member 12 has the resilient ply layer 31, or at least the edge periphery of the resilient ply layer 31 engaging the shoulder 20 on the housing wall 10 and seating thereon. A small space 33 is provided between the periphery of the closure member 12 and the bore 19 through which gases may escape from within the housing 10 when the closure member 12 is unseated from the shoulder 20.

Figure 4:
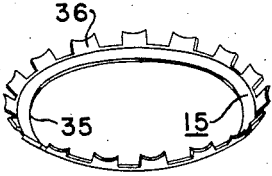
Figure 4 is a perspective elevational view of a resilient retaining ring adapted for retaining the closure cover member in position in the open end of the condenser housing.

The closure member 12 is retained within the bore 19 of the housing wall 10 and against the shoulder 20 in seating and sealing engagement therewith by means of the resilient retaining ring 15, more clearly shown in Figure 4. The resilient retaining ring 15 is in the general form of a frustum of a cone of which the inner peripheral edge 35 forms the apex of the frustum of the cone and the outer peripheral edges of the tooth-like projections 36 form the base edge of the frustum of the cone.

Figure 1:
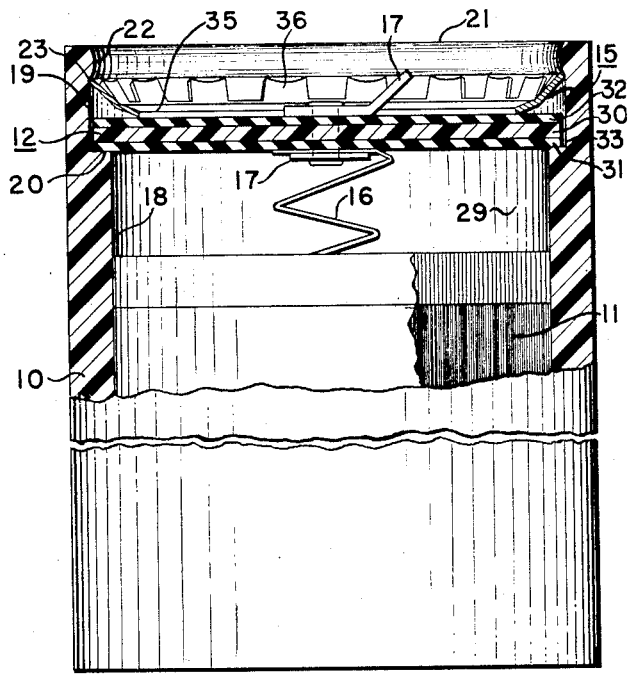
Figure 1 is a vertical cross sectional view of a condenser or capacitor incorporating features of this invention.

As more clearly shown in Figure 1, the resilient retaining ring 15 is positioned between the resilient ply layer 32 of the closure member 12 and the second shoulder 23 on the housing wall 10. The angular position of the resilient retaining ring 15 between the closure member 12 and the shoulder 23 on the housing wall 10 permits the retaining member 15 to be rotated about the base line of the frustum of the cone formed by the peripheral edges of the tooth-like projections 36 that engage the shoulder 23 on the housing wall 10. Also, the apex edge 35 of the retaining ring 15 engaging the resilient ply layer 32 of the closure member 12 provides for resilience between the retaining ring 15 and the closure member 12 by which the closure member 12 may have movement against the apex edge 35 of the retaining ring 15.

Figure 3:
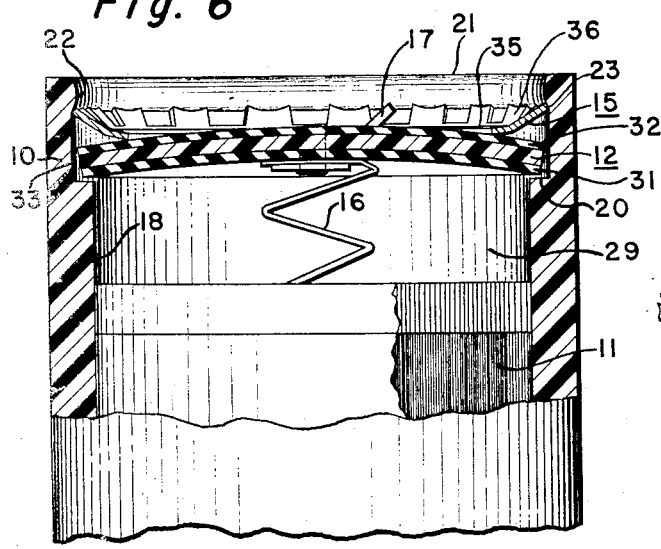
Figure 3 is a vertical cross sectional view similar to Figure 1 but illustrating the closure cover member in venting position for venting of gases from the capacitor housing.

In Figure 3 there is illustrated the venting position, that is the full open venting position, of the closure member. Normally, under all operating normal conditions of the condenser or capacitor, the closure cover member 12 is in the position shown in Figure 1. However, when abnormal conditions are applied to the capacitor or condenser causing internal gasification in the condenser or capacitor and thus a pressure rise internally of the housing 10, the pressure will be effective against the closure member 12 to cause it to move outwardly of the open end 21 of the housing 10 against the resilient resistance of the retaining ring 15.

With the cover member 12, that is the rigid-like member 30, being not completely inflexible, the cover member 12 will first tend to bulge outwardly against the apex edge 35 of the retaining ring 15. This first tendency toward bulging of the cover member 12 will cause the outer peripheral edge thereof to bend toward the shoulder 20, as illustrated in Figure 3, to provide a more effective seal at this time of initial pressure increase internally of the housing 10. This is as it should be for the reason that there is no reason for providing for a premature venting of the gases from within the housing 10 as the pressure rise might be small or short lived with the result of falling off immediately and a return to normal conditions within the capacitor.

However, when the internal pressure rise within the housing 10 reaches a predetermined value beyond which there should be no further rise internally of the capacitor, the cover member 12 will move bodily against the resilient resistance of the retaining ring 15 to effect an unseating of the cover member 12 from the shoulder 20 of the housing wall 10. This unseating of the resilient ply layer 31 from the shoulder seat 20 will permit the high pressure gas internally of the housing 10 to escape through a space 33 provided between the periphery of the cover member 12 and the bore 19 of the housing wall 10.

When the internal high pressure condition is vented, and the internal pressure has fallen to a lower value, the resilient retaining ring 15 will again urge the cover member 12 downwardly upon the seat 20, or shoulder 20, to again reseal the open end 21 of the housing 10 in exactly the same manner as the original seating or sealing.

It will thus be seen that in this invention the cover member 12 is capable of providing innumerable venting operations of the capacitor or condenser without in any way affecting the effectiveness of the seal between the cover member 12 and the housing 10 when the abnormal high pressure condition with the capacitor has passed. The arrangement therefore is such as to provide for greatly increased life of a capacitor since a single venting operation will not destroy the effective seal that is required to maintain long capacitor life.

Figure 5:
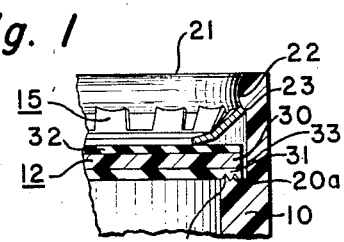
Figure 5 is a cross sectional view of a portion of the condenser housing illustrating a slightly modified structure of the shoulder on which the closure member rests.

In Figure 5 there is illustrated a slightly modified arrangement of a structure wherein the shoulder 20a is provided with a plurality of annular grooves or ridges 40 that are engaged by the resilient ply layer 31 to increase the effectiveness of the seal between the shoulder 20a and the resilient ply layer 31.

Figure 6:
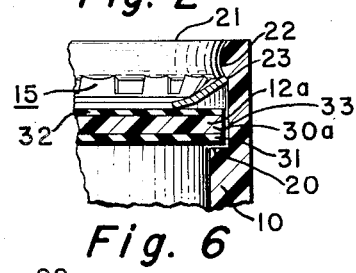
Figure 6 is a cross sectional view of a small portion of the condenser illustrating a further modified structure in which the closure member is illustrated as being completely inflexible.

In Figure 6 there is shown a further modified arrangement of the structure in which the rigid-like member 30a is a completely inflexible member. In this instance the cover member 12a rises vertically relative to the shoulder 20 of the housing 10 to effect a venting operation in the same manner as heretofore described, the only difference being that the initial increasing seal of the ply layer 31 is not obtained as a result of the dome like flexing of the cover member 12 in the manner shown in Fig. 3.

The cover member 12 is composed of the three ply layers to effect a cover member that will not be susceptible to hair line cracking when the rigid-like member or disk 30 is flexed during a venting operation. In the manufacture of the rigid-like disks 30 it is common to have a grain structure develop which is susceptible to hair line cracking along the grain when the disk is flexed. However, by bonding the resilient ply layers 31 and 32 on opposite sides of the rigid-like disk 30, the disk 30 is reinforced along the planes of its opposite sides so that the disk does not develop hair line cracks which would permit air seepage or breathing into and from the capacitor to gradually dry out the capacitor internally once a venting operation had been effected.

While the form of embodiment of the invention as herein disclosed constitutes a preferred form, it is to be understood that other forms might be adopted as may come within the scope of the claims which follow.

What is claimed is as follows:

1. In an electrical condenser assembly having a condenser contained within a gas tight housing and susceptible of internal gasification, the combination of, a housing wall defining an enclosure having a condenser unit disposed in the enclosure and providing one open end for the housing defined by the housing wall, a first shoulder on said housing wall at the open end of the housing extending around the inner periphery of the housing at a common level inwardly of the open end of the housing, a second shoulder on the inner periphery of said housing wall spaced uniformly from said first shoulder, a closure member for the open end of the housing comprising a rigid-like but not inflexible member having a resilient member on one face at the periphery of the rigid-like member, said closure member being disposed in said housing with said resilient member engaging said first shoulder and with a vent space formed between the peripheral edge of said closure member and said housing wall coaxially between said first and second shoulders, and a resilient retaining ring having the general form of a frustum of a cone extending between said closure member and said second shoulder with the base edge of the frustum of the cone engaging said second shoulder and the apex edge of the frustum of the cone engaging said closure member, said resilient retaining ring resiliently applying pressure on said closure member retaining said resilient member in gas tight seating engagement with said shoulder and resiliently movable relative to said first shoulder about the said base edge of the frustum of the cone upon predetermined pressure rise in said housing effective against said closure member to effect dome like flexing of the closure member against said retaining ring and movement thereof against the resilient resistance of said retaining ring to unseat said resilient member from said shoulder for gas venting of said housing through the vent space between said housing wall and the peripheral edge of said closure member, said ring reseating the resilient member on said shoulder upon release of pressure from said housing.

2. In an electrical condenser assembly having a condenser contained within a gas tight housing and susceptible of internal gasification, the combination of, a housing wall defining an enclosure having a condenser unit disposed in the enclosure and providing one open end for the housing defined by the housing wall, a shoulder on said housing wall at the open end of the housing extending around the inner periphery of the housing at a common level inwardly of the open end of the housing, a closure member for the open end of the housing comprising a rigid-like member having a first resilient ply layer on one face of the member and a second resilient ply layer on the opposite face of said member, said ply layers being coextensive with the faces of said rigid-like member, said closure member being disposed in said housing with one of said ply layers engaging said shoulder and seating thereon leaving an annular vent space between the peripheral edge of said closure member and said housing wall, and a resilient retaining ring extending between said second ply layer of said closure member and said wall at the open end of the housing resiliently applying pressure on said second resilient ply layer and thereby resiliently applying pressure on said closure member retaining said first resilient ply layer in gas tight seating engagement with said shoulder, said retaining ring being resiliently movable relative to said shoulder upon predetermined pressure rise in said housing effective against said closure member to effect movement of said closure member resiliently against the resistance of said retaining ring also resiliently movable by movement of said closure member to unseat said first resilient ply layer from said shoulder for gas venting of said housing through the annular vent space between said housing wall and the peripheral edge of said closure member, said ring reseating the first resilient ply layer on said shoulder upon the release of pressure from said housing.

3. In an electrical condenser assembly having a condenser contained within a gas tight housing and susceptible of internal gasification, the combination of, a housing wall defining an enclosure having a condenser unit disposed in the enclosure and providing one open end for the housing defined by the housing wall, a first shoulder on said housing wall at the open end of the housing extending around the inner periphery of the housing at a common level inwardly of the open end of the housing, a second shoulder on the inner periphery of said housing wall spaced uniformly from said first shoulder, a closure member for the open end of the housing comprising a rigid-like but not inflexible member having a first resilient ply layer on one face of the rigid-like member and a second resilient ply layer on the opposite face of said rigid-like member, said resilient ply layers being coextensive with the faces of said rigid-like member, said closure member being disposed in said housing with said first resilient ply layer engaging said first shoulder and seating thereon leaving an annular vent space between the peripheral edge of said closure member and said housing wall, and a resilient retaining ring having the general form of a frustum of a cone extending between said second ply layer of said closure member and said second shoulder on said housing wall with the base edge of the frustum of the cone engaging the said second shoulder and the apex edge of the frustum of the cone engaging said second ply layer, said retaining ring resiliently applying pressure on said closure member retaining said first resilient ply layer of said closure member in gas tight seating engagement with said first shoulder, said retaining ring being movable relative to said first shoulder about the base edge of the frustum of the cone upon predetermined pressure rise in said housing effective against said closure member to effect flexing of the closure member against the apex edge of the frustum of the cone shaped retaining ring and movement of the closure member against the resilient resistance of the retaining ring to unseat said first resilient ply layer from said first shoulder for gas venting of said housing through the annular vent space between the peripheral edge of said closure member and said housing wall, said ring reseating the first resilient ply layer on said first shoulder upon release of pressure from said housing.

4. An electrical condenser assembly in accordance with claim 3 in which the rigid-like but not inflexible member flexes against the apex edge of the retaining ring in a manner of a dome shaped flexing internally of the frustum with the peripheral edge of the closure member rotating pivotally about the apex edge of the frustum, said closure member thereby pivoting its peripheral edge into a portion of the annular vent space during increasing pressure seal of the first resilient ply layer against said first shoulder until sufficient pressure rise is effected in said housing to effect movement of said closure member relative to said first shoulder against the resilient resistance of the retaining ring to move said closure member away from said first shoulder to unseat the said closure member on the first shoulder thereby obviating premature venting through the annular vent space, said retaining ring effecting reseating of the said closure member on said first shoulder upon release of pressure from the housing.

5. An electrical condenser assembly in accordance with claim 1 in which said first shoulder is provided with annular ridges engaged by the said resilient member on said closure member.

References Cited in the file of this patent

UNITED STATES PATENTS

| | | |
|---|---|---|
| 2,178,686 | Georgia | Nov. 7, 1939 |
| 2,404,824 | Booe | July 30, 1946 |
| 2,464,022 | Carpenter | Mar. 8, 1949 |
| 2,535,945 | Menschik | Dec. 26, 1950 |
| 2,591,767 | Andres | Apr. 8, 1952 |